Patented Jan. 18, 1949

2,459,540

UNITED STATES PATENT OFFICE 2,459,540

SEPARATION OF ALKYL-ALKOXYPHENOL MIXTURES

Robert H. Rosenwald, Western Spring, Ill., assignor to Universal Oil Products Company, Chicago, Ill., a corporation of Delaware No Drawing. Application October 1, 1947, Serial No. 777,369

6 Claims. (Cl. 260—613)

This invention relates to a process for separating or concentrating particular alkyl phenols from admixtures of the same with other isomers or other phenols. More specifically, the invention concerns a process for separating o-alkyl-p-alkoxyphenols from the corresponding m-alkyl-p-alkoxyphenols utilizing a solvent which has a selective solubility for the meta derivative and employing a procedure which increases the selectivity of the solvent for said phenol. It is therefore the primary purpose of the invention to provide a solvent extraction process whereby o-alkyl-p-alkoxyphenols may be selectively separated from m-alkyl-p-alkoxyphenols.

It is another object of the invention to increase the inhibitor potency of a mixture of ortho- and meta-alkyl-para-alkoxyphenols by removing therefrom a substantial proportion of the meta isomer which possesses a considerably lesser inhibitor potency than the ortho isomer.

Still another object of the invention is to provide a simple but nevertheless effective means of separating alkyl-alkoxyphenols which have boiling points within close range of each other such that separation by fractional distillation is impractical or in some cases impossible.

In its broad aspects, the present invention relates to a process for concentrating and separating an o-alkyl-p-alkoxyphenol from a m-alkyl-p-alkoxyphenol which comprises adding said mixture of phenols to an aqueous caustic solution in the presence of a water-immiscible solvent for said phenols, separating said water-immiscible solvent phase from the aqueous phase and recovering from the solvent phase a phenol comprising said o-alkyl-p-alkoxyphenol.

In one of its more specific embodiments, the present invention relates to a process for concentrating an o-alkyl-p-alkoxyphenol in mixtures of the same with a m-alkyl-p-alkoxyphenol which comprises dissolving the phenolic mixture in a suitable water-immiscible solvent, thereafter contacting the solvent-phenol solution with an aqueous caustic solution containing from about 0.1 to about 0.5 molar equivalent of caustic per mole of phenol in said phenolic mixture, intimately admixing the resulting aqueous and phenol-solvent phases, allowing the same to stratify, separating said phases and recovering from said phenol-solvent phase a mixture of ortho- and meta-alkyl-para-alkoxyphenols containing a greater proportion of the ortho-alkyl derivative than was present in the original mixture of phenols subjected to extraction.

In accordance with another more specific embodiment of the invention, a mixture of ortho- and meta-alkyl-para-alkoxyphenols is separated by dissolving said mixture in an aqueous caustic solution and thereafter extracting said caustic solution with a water-immiscible solvent which selectively dissolves the ortho-alkyl derivative therefrom.

Further embodiments of the invention relating to other factors involved in the present extraction procedure, to specific applications of the process and to problems of procedural technique will be hereinafter referred to in greater detail in the following further description of the invention.

The prior art has developed a series of organic compounds characterized as alkyl-alkoxyphenols which have received wide application as highly effective oxidation inhibitors, especially for the purpose of inhibiting gum formation in gasolines, particularly those gasolines containing olefins, and in retarding or preventing rancidity and deterioration of various vegetable, animal and petroleum base oils and greases. Inhibitor compounds of the above type are represented structurally by the formula:

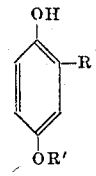

wherein R represents any alkyl group and OR' is an alkoxy group of which R' may be of the same or different structure and molecular weight as R. The ring substituted alkyl groups may be any alkyl group such as methyl, ethyl, propyl, isopropyl, butyl, isobutyl, secondary butyl, tertiary butyl, amyl, isoamyl, etc. Of the above alkyl substituents, the tertiary alkyl groups, and particularly the tertiary butyl group appear to be more effective in contributing to the inhibitor potency of the phenolic compound than other groups of lower molecular weight such as the methyl or ethyl groups. The alkyl group associated with the alkoxy substituent may likewise be selected from any of the alkyl radicals such as the methyl, ethyl, propyl, isopropyl, butyl, etc. groups. Of these, the relatively low molecular weight alkyl groups, such as the $C_1$–$C_3$ radicals when appearing in combination with oxygen as the ether radical apparently form the corresponding phenolic derivatives which have a greater degree of inhibitor potency than the compounds containing larger chain length alkyl groups in the alkoxy radical. Other groups, nevertheless, also possess considerable effectiveness and are not necessarily excluded herein from consideration. Of marked influence on the inhibitor potency of the compound is the position of the alkyl group on the benzenoid nucleus, that is, whether the alkyl groups are ortho or meta relative to the phenolic hydroxy group or whether both positions are occupied by alkyl groups. Observations have shown that of the possible isomers, the compounds having a single alkyl substituent on the benzenoid nucleus in the ortho position have inhibitor potencies from 300 to about 700% greater than the meta substituted or dialkyl substituted phenols. It has been further observed that in the production of the desired o-alkyl-p-alkoxyphenol, some of the meta isomer, as well as the least desired disubstituted alkyl compounds, are unavoidably formed by the methods presently available for the preparation of the compound. Although the disubstituted compound is relatively easily separated from the monoalkyl substituted products by the fractional and/or vacuum distillation, no effective means has been heretofore discovered for separating the isomeric mono-substituted alkyl-alkoxyphenols because of the close proximity of their boiling points and other physical properties, such as solubility in various solvents, melting points, etc. Since the meta isomer posseses a considerable lesser degree of inhibitor potency than the ortho isomer, its presence in admixture with the ortho isomer is particularly disadvantageous because it acts largely as a contaminant of the much more highly effective ortho isomer. It is of considerable importance, therefore, in attempts to further improve the potency of the alkyl-alkoxy-phenol class of inhibitors to provide a means for separating the less desirable meta isomer from admixture with the desired ortho isomer. The present invention has as its primary purpose that of providing a method for accomplishing the separation of m-alkyl-p-alkoxyphenols from o-alkyl-p-alkoxy-phenols to thereby increase the inhibitor potency of the product.

The method herein provided for removal of the undesirable meta isomer from the product formed when the p-alkoxyphenol is alkylated involves a selective solvent extraction procedure in which a combination of solvents and a particular procedure is utilized to effect the extraction. Two basic procedures have been found especially suitable and effective in obtaining the desired separation. In one of said procedures, the mixture of phenols containing the ortho and meta isomers after removal of the dialkyl-p-alkoxyphenols from the product of the alkylation reaction is dissolved in a suitable water-immiscible organic solvent, as hereinafter specified, and the resulting phenol-solvent solution is thereafter contacted with an aqueous caustic solution containing from about 0.1 to about 0.5 mol equivalent of the number of mols of phenols contained in the phenolic mixture charged, employing a liquid-liquid solvent extraction procedure. The caustic solution may be prepared from the relatively inexpensive and otherwise desirable caustic, sodium hydroxide, or for some purposes it may be selected from other caustics such as lithium and potassium hydroxides, especially when the solubility of the sodium phenolate salts of a particular phenolic derivative is somewhat less than the corresponding lithium or potassium phenolate salts. The caustic solution preferably has a concentration within the range of from about 1.0% to about 20%, although solubility relationships for a particular type of phenol may require higher or lower concentrations than the above range. It is noted that when the water-immiscible organic solvent-phenol solution is contacted or thoroughly and intimately mixed with the caustic extractant, the caustic selectively dissolves from the mixture of phenols in the solvent solution an appreciable quantity of the meta-alkyl isomer and that it exerts relatively little solvent action on the ortho-alkyl isomer, the latter preferentially remaining dissolved in the organic solvent. These observations have been made the fundamental principle upon which the present separation procedure depends.

The organic solvent hereinabove referred to in which the mixture of phenols is dissolved when the above procedure is employed in the separation, is characterized as a water-immiscible organic compound capable of dissolving an alkyl-alkoxyphenol. Utilizable solvents of the above type include the hydrocarbon solvents such as the normally liquid paraffins including the butanes, pentanes, hexanes, etc. or a mixture thereof with other hydrocarbons such as occurs in a normally liquid petroleum fraction. Other solvents include aromatic hydrocarbons such as benzene, toluene, xylene, etc., halogenated hydrocarbon derivatives such as chloroform, carbontetrachloride, ethylenedichloride, etc., ethers such as diethyl, dipropyl or di-isopropyl ether, methylethyl ether, etc., alcohols, especially the higher, normally liquid alcohols above $C_4$ chain length, such as pentanol, heptanol, octanol, etc., amines such as the aliphatic amines including compounds such as butylamine, aromatic amines, as for example, aniline, etc. and nitrated hydrocarbons such as nitropentane, nitrohexane, nitrobenzene, etc. Mixtures of one or more of the above classes of compounds may also be utilized as the organic water-immiscible solvent, especially when the solubility of the solvent in the caustic solution is reduced thereby. In most instances, the amount of organic solvent employed is from about equivolumetric proportions of phenol and solvent to as high as 10 to 20 volumes of solvent per volume of phenolic mixture, depending upon the solubility of the phenols therein and the viscosity of the resultant solution. Economically operable proportions are from about 3 to about 8 volumes of solvent per volume of phenolic mixture.

In accordance with another, although not generally preferred procedure, for effecting separation of a mixture of ortho- and meta-alkyl-para-alkoxyphenols utilizing the hereinabove referred to solvent and extractant comprises dissolving the phenolic mixture in an aqueous caustic solution having a concentration of from about 1 to about 20% caustic and containing a molar excess thereof relative to the amount required to convert the phenols in the phenolic mixture to the corresponding phenolate salts. The resulting solution is thereafter contacted, for example by countercurrent extraction with the water-immiscible organic solvent which causes a selective decrease in the solubility of the ortho isomer in the caustic solution. The meta isomer may thereafter be recovered from the caustic solution by acidification and separating the insoluble phenol from the acidified reaction mixture.

The extraction procedure of the present invention is desirably conducted at temperatures as low as permissible, from about 0° to about 50–60° C. and in any event at a temperature below the boiling point of the water-immiscible organic solvent, unless superatmospheric pressures are employed which are sufficient to maintain the solvent in liquid phase. The separation may be conducted batchwise or continuously and in the case of the batch operation and when utilizing the procedure in which the phenolic mixture is dissolved in the aqueous caustic which is extracted with the water-immiscible solvent, the raffinate obtained from the extraction procedure may be subjected to any number of subsequent batch extractions to recover greater quantities of the ortho isomer from the mixture of phenols. Generally, however, the quantity of meta isomer in the extract phase (water-immiscible solvent layer) progressively increases as the extractant successively removes a greater proportion of the ortho isomer from the mixture. When the raffinate is subjected to a series of successive extractions, the extract phase separated therefrom eventually approaches the point at which it contains a greater proportion of the meta isomer than the ortho compound because of the preponderance of the meta alkyl derivative in the raffinate.

Continuous operation of the extraction procedure may be obtained by a suitable countercurrent liquid-liquid extraction wherein the lighter water-immiscible organic solvent is continuously introduced into the bottom of an extraction tower or at a point intermediate the top and the bottom, while the heavier caustic solution (which is the second alternative procedure hereinabove outlined may contain the alkali metal phenolate salts dissolved therein) is introduced into the top of the extraction tower and allowed to flow downwardly against the rising stream of organic solvent. The water-immiscible solvent phase which preferentially retains or extracts the ortho isomer rises to the top of the column and is removed therefrom to a recovery plant where the dissolved ortho isomer may be recovered therefrom. The caustic solution containing a greater proportion of the meta isomer may be subsequently acidified and/or treated in any other manner to recover therefrom the meta alkyl derivative. The extraction tower is desirably of conventional design, containing liquid-liquid contacting means such as a suitable packing material including such materials as berl saddles, etc.

It is not to be inferred that the procedures above outlined necessarily result in extractions of equivalent effectiveness and efficiency, but the particular method to be employed will depend upon the solubility relationships between the phenols, caustic, and solvent which in turn depends to some extent on the particular alkyl groups attached to the benzenoid nucleus of the phenol.

The following example is introduced to illustrate the present invention and particularly the preferred procedure for effecting the separation of ortho- and meta-alkyl-p-alkoxy phenols, although said example is not to be construed as unduly limiting the generally broad scope of the invention in strict accordance thereto.

A mixture of ortho- and meta-tertiarybutyl-p-methoxyphenols formed by the alkylation of p-methoxyphenol with isobutylene in the presence of phosphoric acid as catalyst followed by vacuum distillation of the resultant product was separated by the following batchwise procedure: 100 grams of a mixture of said phenols was dissolved in 200 cc. of pentane and the resultant solution extracted with 30 cc. portions of a 5% aqueous solution of sodium hydroxide. Each of the aqueous extract phases were then separately acidified and the free phenol released thereby was decanted from the aqueous phase or extracted with diethylether and the ether evaporated from the extract.

The phenols separated from the extract phases of extractions 1 to 6 (30 grams) contain almost pure m-tertiarybutyl-p-methoxyphenol and had melting points, after recrystalization from heptane, of from about 45° to about 60° C. Extractions 7 and 8 yielded approximately 20 grams of mixed phenols having a melting point of from about 50° to about 60° C. Extractions 9 to 11 yielded 9.8 grams of mixed phenols when softened at 60° C. The remaining raffinate phase (pentane and dissolved phenol) when evaporated to dryness and recrystalized had a melting point of 62–63° C. and comprised chiefly o-tertiarybutyl-p-methoxyphenol.

I claim as my invention:

1. A process for concentrating and separating an o-alkyl-p-alkoxyphenol from a m-alkyl-p-alkoxyphenol which comprises adding said mixture of phenols to an aqueous caustic solution in the presence of a water-immiscible solvent for said phenols, separating the water-immiscible solvent phase from the aqueous phase and recovering from the water-immiscible solvent phase phenols comprising said o-alkyl-p-alkoxyphenol.

2. A process for concentrating and separating an o-alkyl-p-alkoxyphenol from a m-alkyl-p-alkoxyphenol which comprises dissolving the mixture of phenols in a water immiscible organic solvent and contacting the resultant solution with an aqueous caustic solution having from about 0.1 to about 0.5 mol equivalent of the phenols in said mixture, separating a raffinate phase comprising the water immiscible solvent from an extract phase comprising said aqueous caustic solution and recovering the phenols contained therein.

3. A process for concentrating and separating an o-alkyl-p-alkoxyphenol from a m-alkyl-p-alkoxyphenol which comprises dissolving the mixture of phenols in an aqueous caustic solution and thereafter contacting said solution with a water immiscible organic solvent to form a raffinate phase and an extract phase, separating said phases and recovering said phenols from each of said phases.

4. The process of claim 1 further characterized in that said water immiscible solvent is a normally liquid hydrocarbon.

5. The process of claim 1 further characterized in that said water immiscible solvent is a normally liquid organic ether.

6. A process for concentrating and separating an o-tertiarybutyl-p-alkoxyphenol from a m-tertiarybutyl-p-alkoxyphenol which comprises dissolving the mixture of phenols in a water-immiscible organic solvent and thereafter contacting the resulting phenol-solvent solution with an aqueous caustic solution to form a raffinate phase and an extract phase, separating said phases and recovering said phenols from each of said phases.

ROBERT H. ROSENWALD.

REFERENCES CITED

The following references are of record in the file of this patent:

UNITED STATES PATENTS

| Number | Name | Date |
|---|---|---|
| 2,245,945 | Van Dijck et al. | June 17, 1941 |
| 2,310,710 | Rosenwald et al. | Feb. 9, 1943 |